United States Patent [19]

Furusawa et al.

[11] Patent Number: 5,202,066
[45] Date of Patent: Apr. 13, 1993

[54] METHOD OF PLASTICIZING MOLDING MATERIAL AND APPARATUS THEREFOR

[75] Inventors: Toshihiro Furusawa; Atsushi Satoh, both of Sodegaura; Takashi Nakajima; Noriaki Matsugishi, both of Tokyo, all of Japan

[73] Assignees: Idemitsu Kosan Co., Ltd.; Seidensha Electronics Co., Ltd., both of Tokyo, Japan

[21] Appl. No.: 823,043

[22] Filed: Jan. 15, 1992

Related U.S. Application Data

[63] Continuation of Ser. No. 512,875, Apr. 23, 1990.

[30] Foreign Application Priority Data

Apr. 25, 1989 [JP] Japan .................. 1-103530
Jan. 23, 1990 [JP] Japan .................. 2-12865

[51] Int. Cl.⁵ ............................ B29B 13/08
[52] U.S. Cl. .......................... 264/23; 264/69; 264/70; 264/349; 264/328.1; 366/127.2; 425/174.2
[58] Field of Search ............ 264/23, 69–71, 264/176.1, 349, 328.1; 425/174.2, 145, 381, 174; 366/127

[56] References Cited

U.S. PATENT DOCUMENTS

| | | | |
|---|---|---|---|
| 2,802,237 | 8/1957 | Davis | 264/70 |
| 3,233,012 | 2/1966 | Bodine, Jr. | 264/23 |
| 3,239,881 | 3/1966 | Larson | 264/70 |
| 3,285,442 | 11/1966 | Tigner | 264/70 |
| 3,392,224 | 7/1968 | Archer | 264/70 |
| 3,523,147 | 8/1970 | Hold et al. | 264/23 |
| 3,619,429 | 11/1971 | Torigai et al. | 264/23 |
| 3,663,668 | 5/1972 | Fairbanks | 264/23 |
| 4,793,954 | 12/1988 | Lee et al. | 264/23 |

FOREIGN PATENT DOCUMENTS

| | | | |
|---|---|---|---|
| 134052 | 2/1979 | German Democratic Rep. | 425/174 |
| 38-7872 | 6/1963 | Japan | 264/70 |
| 60-105513 | 6/1985 | Japan | 425/174.2 |
| 939262 | 6/1982 | U.S.S.R. | 425/174.2 |

*Primary Examiner*—Jeffery Thurlow
*Attorney, Agent, or Firm*—Hidaka and Benman

[57] ABSTRACT

Disclosed is a plasticization method in which a molding material is supplied to a cylinder having a built-in screw to plasticize the molding material, and further, at least one of the cylinder and the screw is resonated to carry out the plasticization of the molding material. Also disclosed is a plasticization method in which the cylinder is vibrated by progressive waves to plasticize the molding material, and an apparatus able to carry out these plasticization methods.

11 Claims, 8 Drawing Sheets

METHOD OF PLASTICIZING MOLDING MATERIAL AND APPARATUS THEREFOR

This is a continuation of co-pending application Ser. No. 07/512,875 filed on Apr. 23, 1990.

BACKGROUND OF THE INVENTION

1. Field of the Invention

The present invention relates to a method and an apparatus for carrying out a plasticization, i.e. an even softening, of a molding material. More particularly, it relates to a method and an apparatus for supplying a molding material to a cylinder having a built-in screw, to plasticize the molding material.

2. Description of the Related Art

When a molding material, for example, a thermoplastic material or a ceramic material combined with a binder, is molded by injection molding, extrusion molding or a blow molding, usually, a method of carrying out the plasticization, whereby the molding material is supplied to a heated cylinder in which a screw is rotated, to thereby plasticize the material, is used.

Recently, in such a plasticization method, to improve such physical properties as the strength of the molded products, a development of a ultra high-molecular weight the plastic material, an addition of large amount of inorganic fillers, and a reduction of the binder content when the material is a ceramic material, have been carried out.

Nevertheless, the plasticizing of molding material, such as a ultra high-molecular weight plastic materal, an inorganic-filled plastic material or a ceramic material having a low binder content in a short time is difficult. In addition, when such plasticization is carried out, a compression zone of the screw may suffer conspicuous wear.

To overcome the above disadvantages, a method of applying ultrasonic waves to a nozzle portion of the screw or a tip of an extruder is disclosed in Japanese Examined Patent Application (Kokoku) No. 45-39954 (JPP 45-39954).

In the method disclosed in the JPP 45-39954, the apparent viscosity of the molding material is reduced by the appllication of ultrasonic-waves, and thus the time required for carrying out the plasticization is shortened and abrasion of the screw is greatly reduced.

Nevertheless, the prior art method suffers from the following disadvantages:

(1) In general, the plasticizing of a material supplied to the cylinder is mainly started at one side of a cylinder wall, and thus it is not always possible to carry out an even plasticization of the material in all parts of the cylinder. The application of ultrasonic waves to the screw eliminates the above problem, but the effect thereof is very limited, and accordingly, the prior art method does not fully overcome the problem.

(2) A mere application of the ultrasonic-waves to the screw has less effect.

SUMMARY OF THE INVENTION

An object of the present invention is to provide a method of plasticizing a molding material in a shorter time by carrying out the plasticization thereof through an effective application of a vibration to the molding material, in particular, applying ultrasonic wave vibration to the molding material, and to provide an apparatus using this method.

Another object of the present invention is to provide a method of carrying out plasticizing a molding material whereby the time for producing molded products is greatly shortened by carrying out the plasticization of the molding material at a high speed, and to provide an apparatus using this method.

Still another object of the present invention is to provide an apparatus for plasticizing molding materials, in which an abrasion of a cylinder and a screw caused by fillers such as a glass fiber or a metal fiber, or ceramics can be greatly reduced.

Yet another object of the present invention is to provide an apparatus for plasticizing a molding material, by which molded products having a stabilized quality are produced to a great reduction of the abrasion of the cylinder and screw.

As a method of plasticizing a molding material, in which the molding material is supplied to a cylinder having a built-in screw, in a method of plasticizing a molding material in accordance with the present invention, the plasticization is carried out by creating a resonance in all and/or a part of at least one of a screw and a cylinder, particularly, an n wavelength resonance (where n is m/2 and m is a positive integer), by applying ultrasonic-waves thereto, to thereby produce a plastic material from the molding material.

In addition, as a method of plasticizing a molding material in which the molding material is supplied to a cylinder having a built-in screw, in a method of plasticizing a molding material in accordance with the present invention, the plasticization of a molding material is caried out by vibrating a cylinder by a vibration generated by progressive waves.

An apparatus for plasticizing a molding material in accordance with the present invention includes a cylinder provided with a screw insertion hole, and a screw inserted into the screw insertion hole, in which at least one of the screws and the cylinders is joined to a vibration generating apparatus and at least one of the screws and the cylinder is resonated by applying a vibration thereto. Preferably, the plasticization apparatus includes a vibration direction changing means for changing a direction of vibration applied to the cylinder, by approximately 90 degrees and transmitting the same.

In the above construction, the object to be resonated may be either the cylinder or the screw, or may be both the cylinder and the screw at the same time. Alternatively, a part of the cylinder can be resonated.

When both the cylinder and the screw are resonated, the resonance frequencies of the cylinder and the screw may be the same or different.

The construction of the vibration direction changing means is not specifically limited, and this means may be constructed by a projection protruding from an outer circumference of the cylinder to an outer side of the cylinder. A height, width, and shape, etc., of the projection can be suitably designed in response to a shape of the cylinder and an operating temperature. When the projection is used as the vibration direction changing means, the vibration generation apparatus is attached to a tip of the projection.

The joining of the cylinder and the screw, and the vibration generation apparatus and vibration absorption means, is achieved by a direct connection or through a vibration transmission member such as a horn.

By resonating the screw and/or all and/or a part of the cylinder, the molding material supplied to the cylinder is vibrated and well mixed to thereby ensure a proper plasticization of the molding material. Furthermore, a propelling force generated by the vibration increases the speed of the extrusion of the molded material.

BRIEF DESCRIPTION OF THE DRAWINGS

Other objects and features of the present invention will be described in more detail with reference to the accompanying drawings, in which.

DESCRIPTION OF THE PREFERRED EMBODIMENTS

An embodiment of an apparatus for carrying out the plasticization of a molding material (hereinafter, plasticization apparatus) according to the present invention, will be described with reference to FIG. 1.

Figure 1:
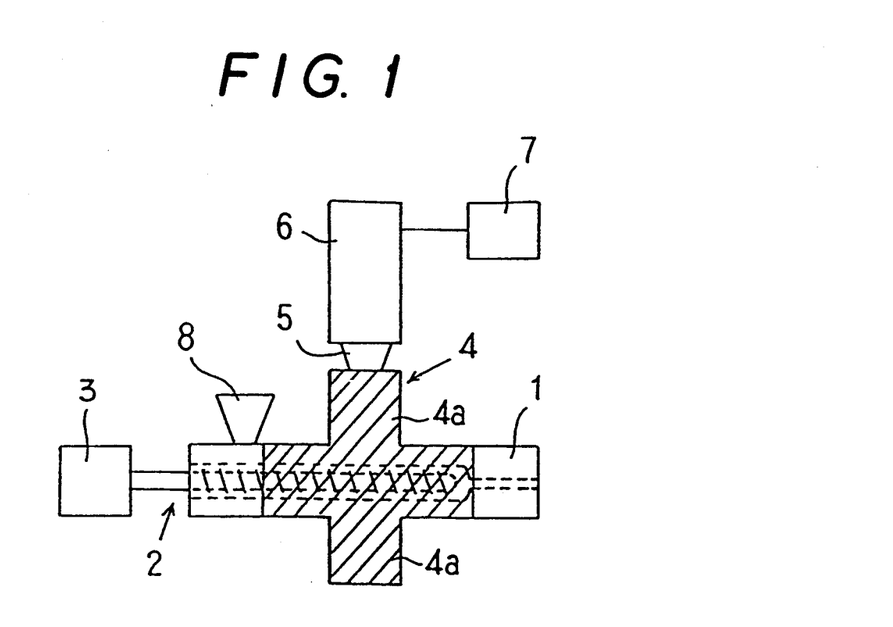
FIG. 1 is a conceptual side view of an embodiment of a plasticization according to the present invention.
Figure 2:
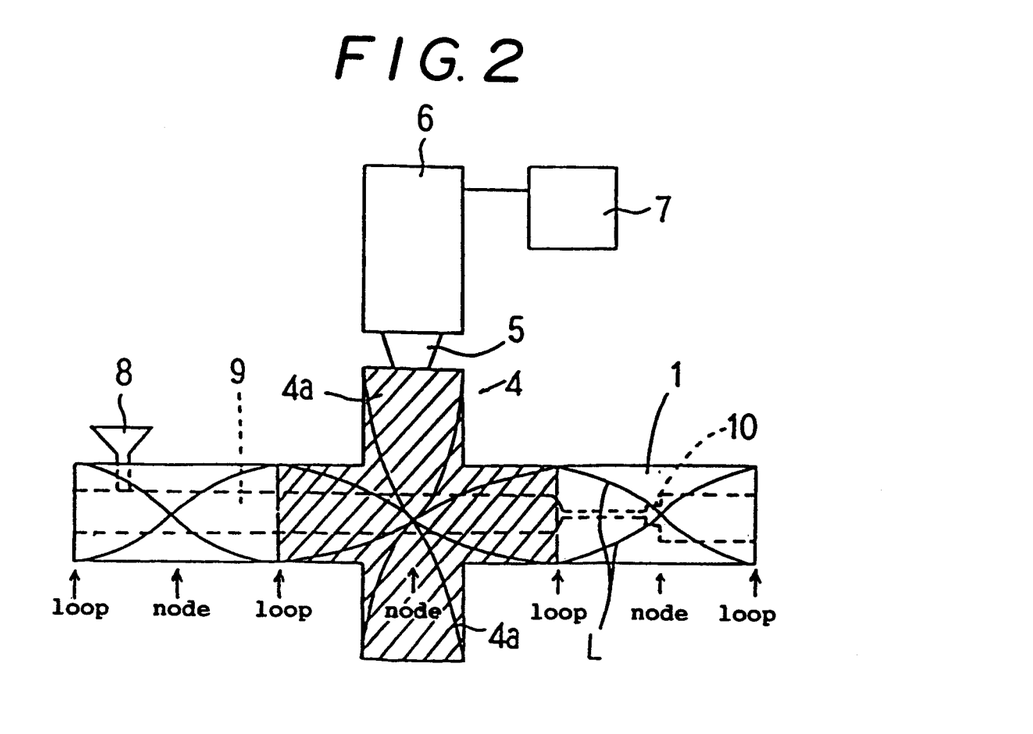
FIG. 2 is a side view of a cylinder of the plasticization apparatus shown in FIG. 1, and other components therein, and shows the displacement waveforms thereof when resonated.

The plasticization apparatus shown in FIG. 1 is provided with a cylinder 1 having a built-in screw 2. The cylinder 1 has a screw insertion hole 9, as shown in FIG. 2, and the screw 2 is inserted into the screw insertion hole 9. The screw 2 is driven and rotated by a motor 3.

A longitudinal-longitudinal (L-L) transformer 4 is mounted at approximately center portion of the cylinder 1, and an ultrasonic transducer 6 is connected to an end surface of the L-L transformer 4 through a horn 5. The ultrasonic transducer 6 is energized by a ultrasonic-wave oscillator 7, and generates ultrasonic vibrations by which the cylinder 1 is resonated. The cylinder 1 is previously designed to be resonated on the basis of a temperature distribution during a molding of the cylinder 1. Note, a wavelength n of the resonance is m/2, where m is a positive integer and normally lies between 1 and 20.

FIG. 2 is a view illustrating curves L representing the displacement waveforms of the cylinder 1 when the cylinder 1 is resonated. In the drawing, "loop" indicates portions at which the displacement waveforms are farthest apart from each other, i.e., portions at which the cylinder 1 is vibrated at the maximum magnitude, and "node" indicates portions at which the displacement waveforms intersect each other, i.e., portions at which the cylinder 1 is not vibrated.

The L-L transformer 4 transmits the vibration induced by the ultrasonic transducer 6 to the cylinder 1 by changing the direction of the vibration by approximately 90 degrees, and has a pair of opposing projections 4a. The heights and widths of the projections 4a are preset to values predetermined to be compatible with the resonance. Normally, as shown in FIG. 2, the shapes of the projections 4a are designed such that the loops are located at end surfaces of the projections 4a.

As shown in FIG. 2, the cylinder 1 is provided with a hopper 8, and a molding material such as a thermoplastic material is supplied to the screw insertion hole 9 of the cylinder 1 from the hopper 8. The supplied molding material is plasticized by rotating the screw 2 in the cylinder 1 (see FIG. 1), moved toward the right side as viewed in the drawing, and discharged from a release hole 10. When the plasticization apparatus is applied to a molding machine such as an injection molding machine or an extruder, a die is arranged at a downstream portion of the release hole 10. In particular, when the plasticization apparatus is applied to an injection molding machine, a nozzle (not shown) is provided at the release hole 10.

Preferably, the release hole 10 is arranged at a node portion of the displacement waveforms L, as in this arrangement ensure that, when the nozzle or other components are connected to the release hole 10, a transmission of the vibration of the cylinder 1 to the outside is prevented.

The hopper 8, which functions as an intake for the molding material, can be mounted at any positions on the cylinder 1 but preferably, since the hopper 8 is designed to have a resonance frequency equal to a resonance frequency of the cylinder 1 under a molding condition, the hopper 8 is placed at a location other than the nodes of the displacement waveforms L, i.e., the hopper 8 is placed at a vibrating portion of the cylinder 1. In this construction, the hopper 8 is resonated together with the cylinder 1, and as a result, a bridging of the molding material in the hopper 8 can be prevented, and accordingly, a smooth supply of the molding material achieved.

Note, the hopper 8 can be mounted at the node of the displacement waveforms L, and the plasticization apparatus can be used without vibrating the hopper 8, as in the prior art.

In the embodiment of the present invention, the plasticization of the molding material is carried out by the screw 2, and the cylinder 1, which is vibrated at the n wavelength resonance, and a result, the molding material is effectively mixed to ensure a proper plasticization thereat.

Figure 3:
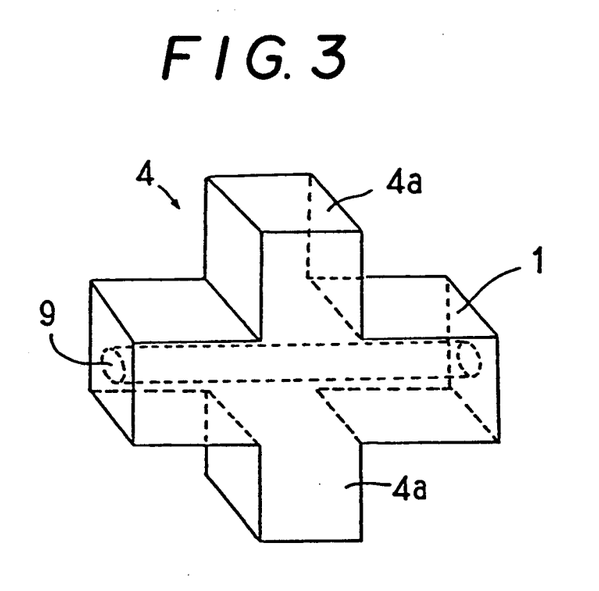
FIG. 3 and FIGS. 4a to 4d are perspective views of specific examples of the cylinder.
Figure 4A:
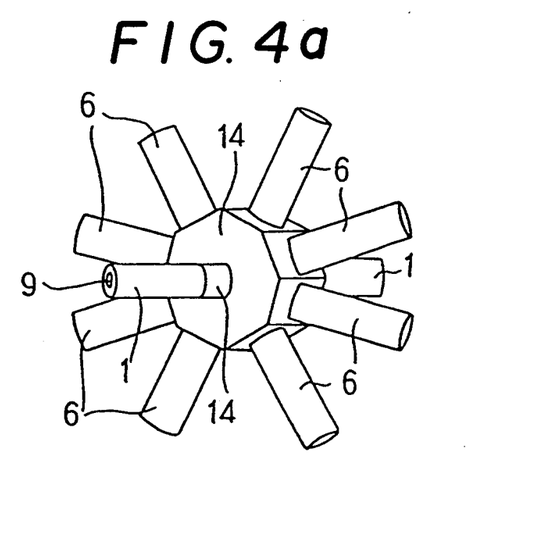
Figure 4B:
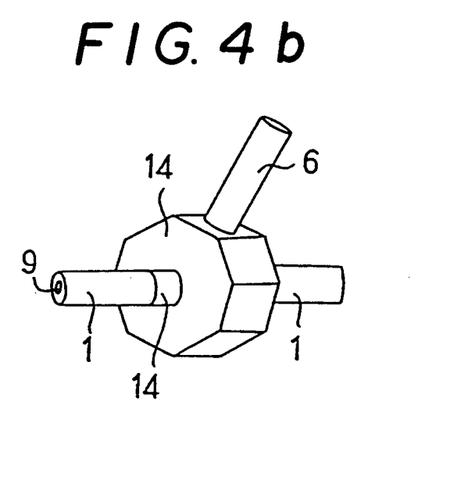
Figure 4C:
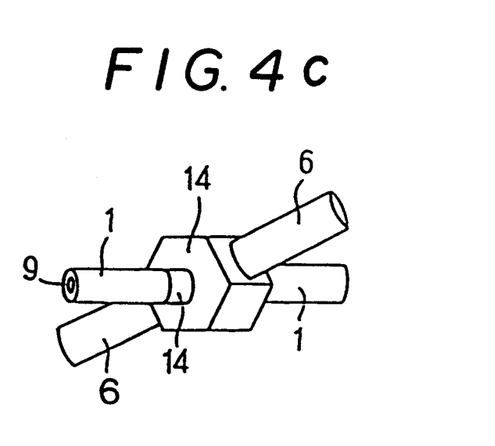
Figure 4D:
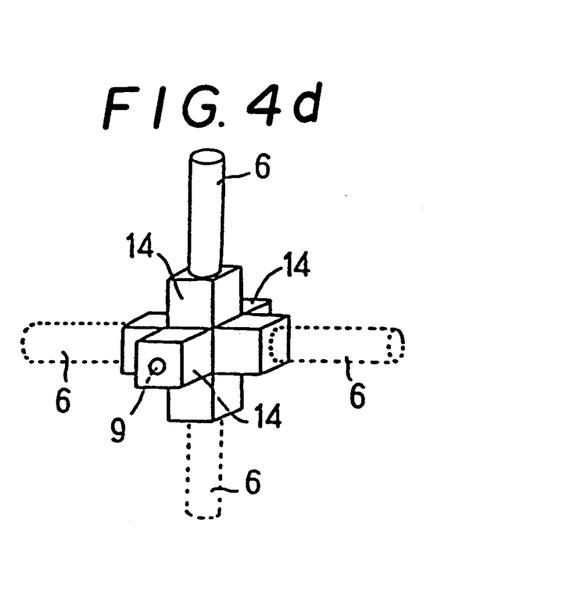

In the above embodiment, as shown in FIG. 3, the cylinder 1 has an approximately rectanguler shape, and the L-L transformer 4 functioning as a direction changing means of the ultrasonic-wave vibrations is attached at approximately the center of the cylinder 1. Nevertheless, instead of this construction, as shown in FIGS. 4a to 4c, the cylinder 1 may have the shape of a cylinder, and a radial-longitudinal (R-L) transformer 14 functioning as the ultrasonic-wave vibration direction changing means can be mounted approximately at the center of an outer circumference of the cylinder 1. Also, an L-L-L transformer 14 shown in FIG. 4d can be used. The R-L transformer 14 shown in FIGS. 4a to 4c can be driven through only one surface attached to the ultrasonic transducer 6, as shown in FIG. 4b, but preferably the R-L transformer 14 is driven through at least two surfaces attached to the ultrasonic transducer 6, as shown in FIG. 4c.

The number of the ultrasonic transducers 6 is determined on the basis of the number of required material outputs, and to increase the output force, a plurality of the ultrasonic transducer 6 can be provided.

Figure 5:
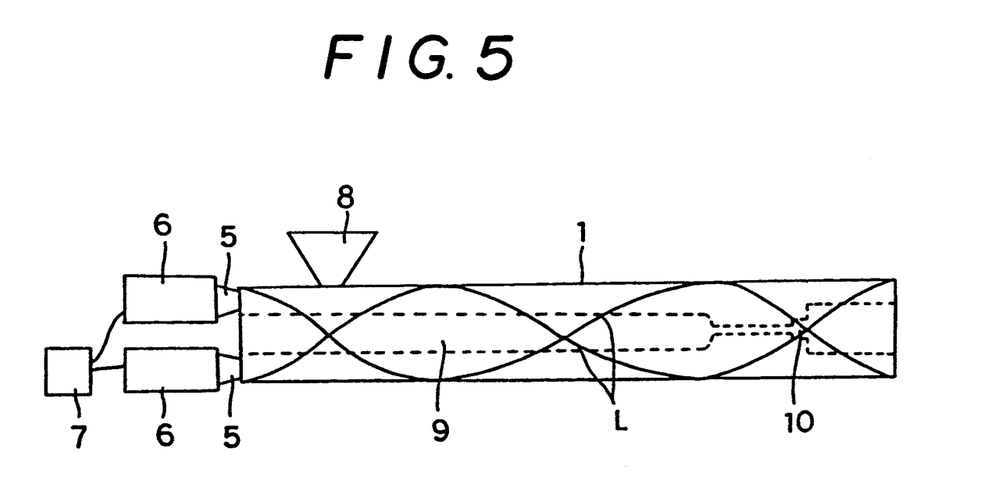
FIG. 5 is a conceptual side view of a specific example of another plasticization apparatus, and shows the displacement waveforms thereof.

According to the embodiment of the present invention, the ultrasonic-wave vibrations are propagated along the direction of a flow of the molding material, to effectively plasticize the molding material. Accordingly, the ultrasonic-wave vibrations can be applied to an inlet of the screw 2 or to an outlet of a melt resin, and consequently, the ultrasonic-wave vibrators 6 can be placed around the inlet of the screw 2 (as shown in FIG. 5), or the ultrasonic-wave vibrators 6 can be placed around the molding material outlet.

If the diameter of the cylinder is small, it is difficult to mount the ultrasonic transducer 6 around the inlet of the screw 2 or the molding material outlet, and thus preferably the vibration direction changing means is used.

The resonance wavelength n of the cylinder 1 is preferably kept as small as possible, to effectively resonate the cylinder 1.

Also, preferably the cross section of the supply side of the molding material to the cylinder 1 is as small as possible, to increase the amplitude of the vibration of the cylinder 1 at the material supply side. In this case, when a positional relationship of the loops and the nodes, the vibration amplitudes, and other conditions are suitably selected, a molding material having a low viscosity can be plasticized without rotating the screw 2.

In general, the cylinder 1 is provided with a heating means such as a far-infrared ray heater, for heating the inner molding material in the cylinder 1. In this case, a loosening of attaching means, such as screws attaching the heating means, by the vibration must be avoided, and thus preferably the heating means is attached at the location of node of the displacement waveforms L.

A portion of the cylinder 1 to which the hopper 8 is attached can be water-cooled, as in the prior art, and in this case, an intake of a cooling water for the cylinder 1 and an outlet of the cooling water from the cylinder 1 are positioned at the locations of nodes when the cylinder 1 is resonated, to prevent a loosening of screw joint thereof.

If the vibration may be binded by the transmission of heat to the ultrasonic transducer 6, the horn 5 can be cooled.

The cylinder 1 is supported by a suitable supporting structure. In this case, preferably the portions of the cylinder 1 to be supported by the supporting structure are at the locations of nodes of the displacement waveforms L, to prevent the transmission of vibration through the supporting structure member to the outside.

The cylinder 1 can be constructed as not only an integral unit but also as an assemble of a plurality of parts. In the latter case, the jointed surfaces of the cylinder 1 should be located at the loops of the displacement waveforms L, to effectively transmit the vibration.

The cylinder 1 can be made of any material which will effectively transmit the vibration, for example, iron, stainless steel, aluminum, phosphor bronze, titanium, and K-monel. Preferably, the cylinder 1 is made of duralumin or a titanium alloy, from the viewpoint of a higher resistance to fatigue induced by the ultrasonic-wave vibration and the obtaining of a large amplitude of vibration. To limit corrosion and abrasion caused by the molding material, the cylinder 1 can be annealed or surface-treated by a plating process, or the like.

Figure 6:
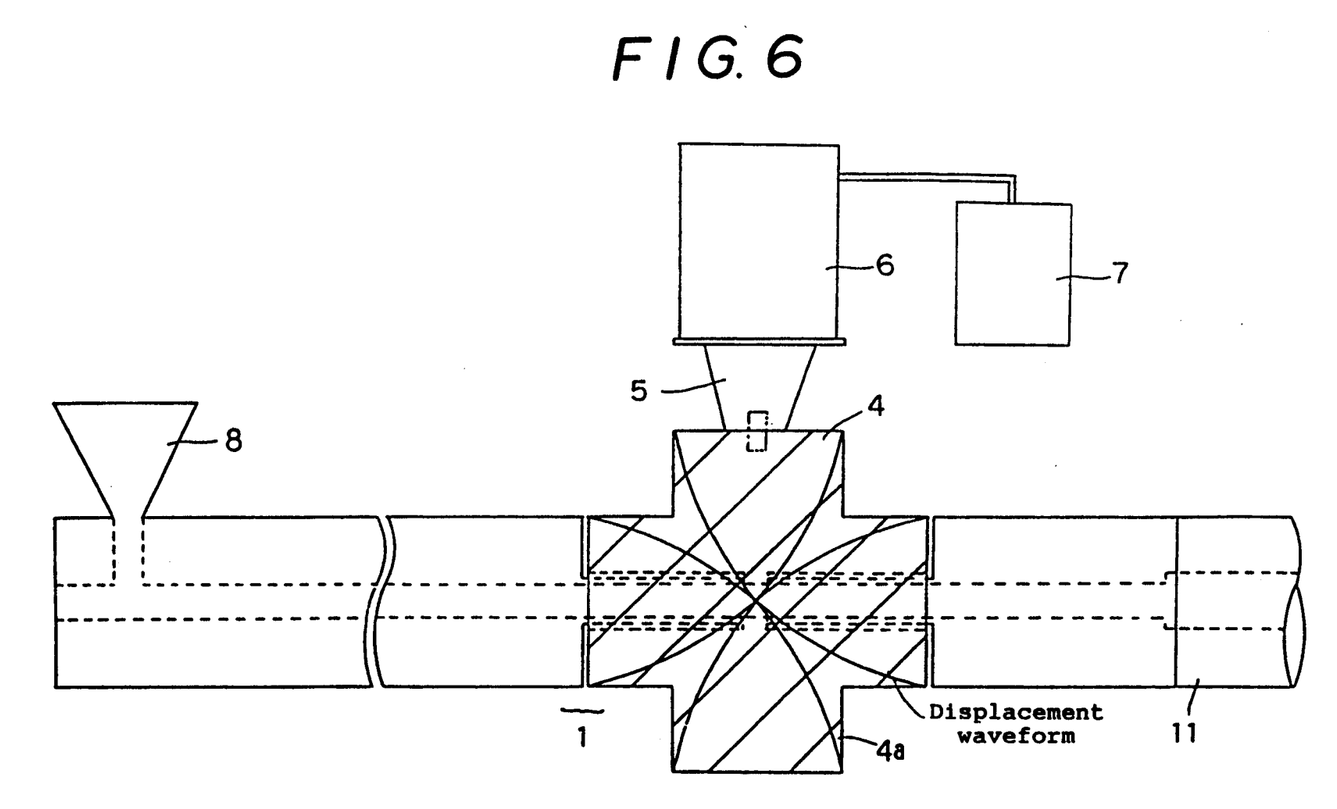
FIG. 6 is a conceptual side view of still another specific example of a plasticization apparatus, and shows the displacement waveforms thereof.

FIG. 6 is a side view of the cylinder 1 in the present apparatus, showing a part to which the ultrasonic-waves are applied to carry out the molding while resonating that part.

In FIG. 6, the cylinder is divided into three parts, any one of which can be constructed as the L-L transformer 4. The end surface of the L-L transformer 4 is connected to the ultrasonic transducer 6 through the horn 5. The ultrasonic transducer 6 is driven by the ultrasonic-wave oscillator 7 to resonate only a hatched portion 4 in FIG. 6 (the L-L transformer 4). Portions of the cylinder which are not resonated by the vibration are attached at the location of the nodes of the L-L transformer 4 by a jointing means such as screw (not shown). As a result, the ultrasonic-wave vibrations are not transmitted to any portions other than the L-L transformer 4. When the die is directly connected to the L-L transformer 4, the L-L transformer 4 is connected at the locations of the nodes.

The L-L transformer 4 can be attached to any of a supply zone, a compression zone, and a metering zone of the cylinder. When the L-L transformer 4 is attached to the supply zone, a stabilized supply can be obtained, when the L-L transformer 4 is attached to the compression zone, the plasticized material is propelled by the pressure therein, and thus abrasion of the cylinder is suppressed, and when the L-L transformer 4 is attached to the metering zone, the extrusion of the mixed melt resin is enhanced. Accordingly, the positions at which the L-L transformer 4 is attached can be selected in response to the required effect.

Furthermore, when the portions of the apparatus plasticizing the molding material are to be resonated, the vibration direction changing means can be used for any of the transformers shown in FIGS. 4a to 4d, in addition to the L-L transformer described above.

In the embodiment of the present invention, all or a part of the cylinder 1 is resonated, but the screw 2 is not resonated, as an example. Nevertheless, all or a part of the cylinder 1 can be resonated, and at the same time, the screw 2 also can be resonated. Alternatively, the screw 2 alone can be resonated.

Figure 7:
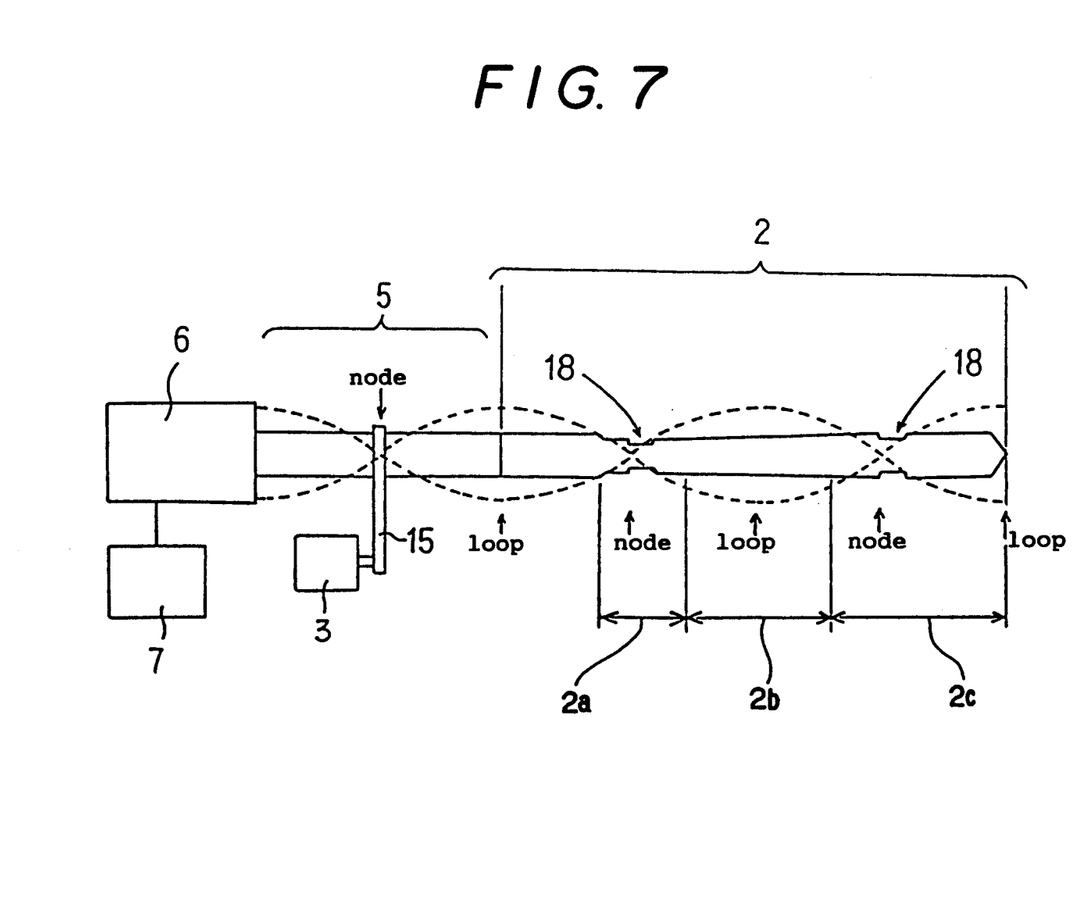
FIG. 7 is a conceptual side view of a screw and other components in the above plasticization apparatus, and shows the displacement waveforms thereof.

FIG. 7 is a view of a specific construction of the screw 2, when the screw 2 is resonated.

In the drawing, the motor 3 is connected to one end at a material supply side (the left side of the drawing) through a power transmission means 15 such as a belt or a chain. The screw 2 is driven and rotated by the motor 3. The ultrasonic transducer 6 is joined to the left end of the screw 2 through the horn 5, and is further connected to the ultrasonic-wave oscillator 7 by, for example, a connector. The screw 2 is resonated at the same resonance frequency as the resonance frequency of the ultrasonic transducer 6, by the vibration of the ultrasonic transducer 6. The resulting loops and nodes of the displacement waveforms L of the screw 2 are shown in the drawing.

The amplitude of the ultrasonic transducer 6 can be varied by changing the shape of the horn 5 in the screw 2. Also, as for the cylinder 1, the horn 5 must be forcibly cooled when the plasticization is carried out at a high temperature.

The horn 5 and the screw 2 can be an integral unit, or formed separately and then assembled. In the latter case, the production cost of the screw 2 is lowered.

The shape of the screw 2 is not specifically limited, but since stress is imposed at positions corresponding to the nodes of the resonance waveforms when the screw is resonated, a chamfering or rounding-off of those portions should be carried out to prevent the generation of cracks.

The screw 2 can be formed by a plurality of parts, but in this case the parts should be joined to each other at portions as near to the loops as possible, and the area of the contacting surfaces be made as large as possible, to ensure a required resonating of the whole of the screw 2.

Preferably, the horn 5 is formed as a ¼ wavelength resonator, to minimize vibration transmission loss.

The power transmission means 15 is preferably attached at an approximately center position of the horn 5, i.e., at the nodes of the displacement waveforms L. When the plasticization apparatus of the molding material is used as an injection molding machine, the screw 2 must be moved forward the right side by, for example, a hydraulic pressure. In this case, the node positions of the horn 5 are subjected to pressure and moved forward.

When the plasticization is carried out by rotating the screw 2, the screw 2 can be divided into three zones: a supply zone 2a, a compression zone 2b, and a metering zone 2c, as shown in FIG. 7. The compression zone 2b is a very important zone in which a pressure is applied to the material to promote the plasticizing thereat. When the screw 2 is resonated, the resonance should be such that the loop of the displacement waveforms L of the resonance is preferably located in the compression zone 2b. As a result, the speed of the plasticization is greatly increased due to the effect of this vibration.

While the plasticization is underway, the material in contact with the screw 2, which is resonated, is pulled to the portions corresponding to the nodes of the displacement waveforms L. This action is due to a propelling force caused by the vibration. To use this propelling force, as shown in FIG. 7, a depth of a groove 18 at the right side corresponding to the node (i.e., the downstream side with respect to a direction of movement of the material) should be deep, and as a result, the material at the upstream side (the left side) is pulled to the node, and thus the pulling of the material at the downstream side (the right side) to the node by the deep groove 18 is prevented to pull to the node, and consequently, a smooth movement of the material to the right direction is realized.

A vent-type screw is also designed in the same way mentioned above.

When the cylinder 1 and the screw 2 are simultaneously resonated, preferably, the positions of the loops and the nodes of the displacement waveforms L of the screw 2 should be close to the positions of those of the cylinder 1, respectively.

The material of the screw 2 can be similar to that of the cylinder 1, as described above, or the materials of the cylinder 1 and screw 2 can be wholly or partially different from each other.

Figure 8:
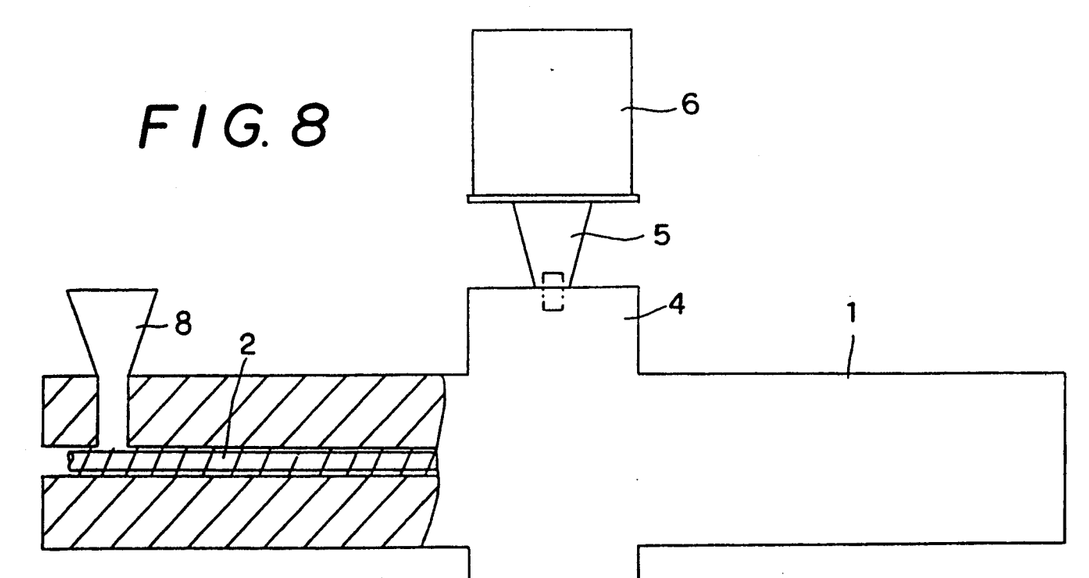
FIG. 8 is a partially cutaway conceptual side view of a twin screw extruder in the plasticization.
Figure 9:
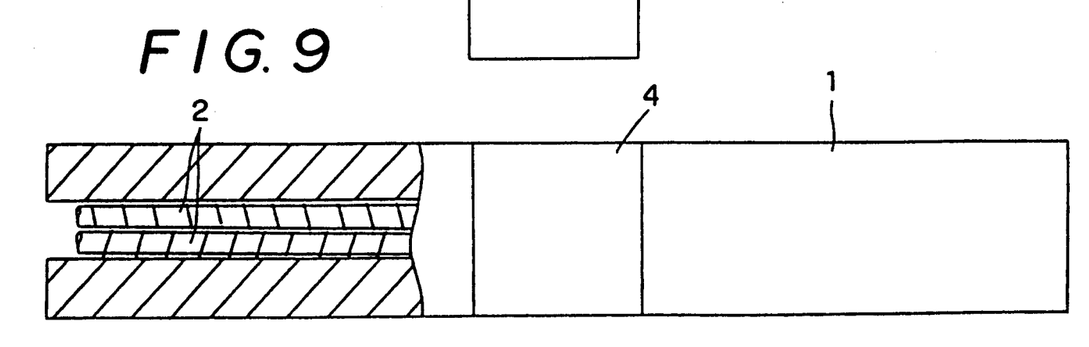
FIG. 9 is a partially cutaway conceptual plane view of the twin screw extruder shown in FIG. 8.

In the above embodiment of the present invention, a plasticization by a single screw extruder is described, but the plasticization according to the present invention can be similarly achieved by a twin screw extruder (see FIGS. 8 and 9 illustrating a partially cutaway side view and a plane view of the twin scew extruder) or a multi-axes screw extruder. The twin screw extruder comprises non-interposed-blade type (low-speed type or high-speed type) screw extruder and an interposed blade-type (a same-direction type or a different-direction type) screw extruder.

Figure 10:
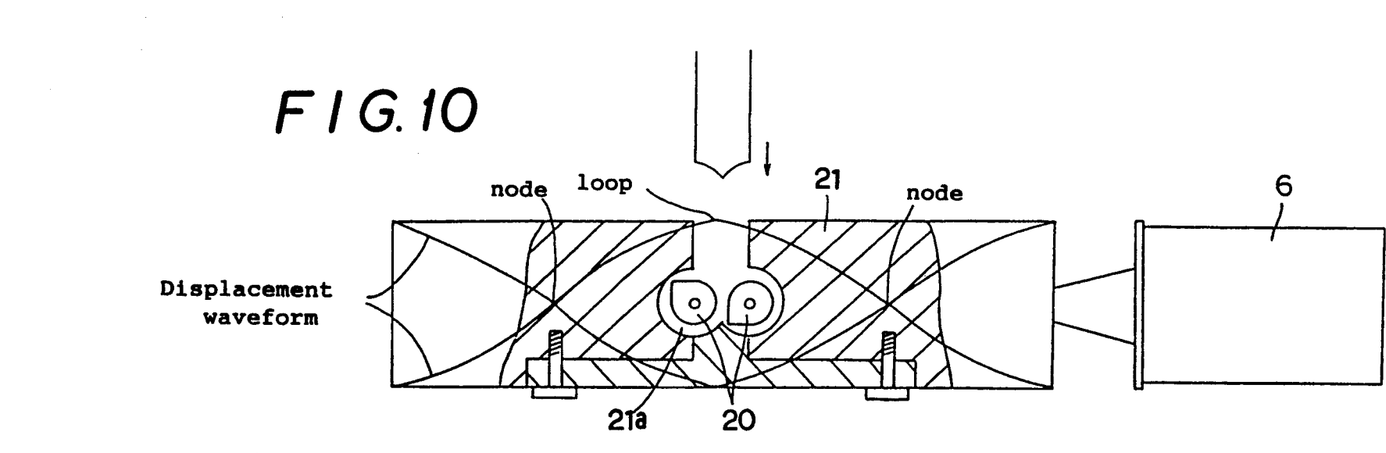
FIG. 10 is a partially cutaway conceptual side view of an intensive mixer in the plasticization apparatus.
Figure 11:
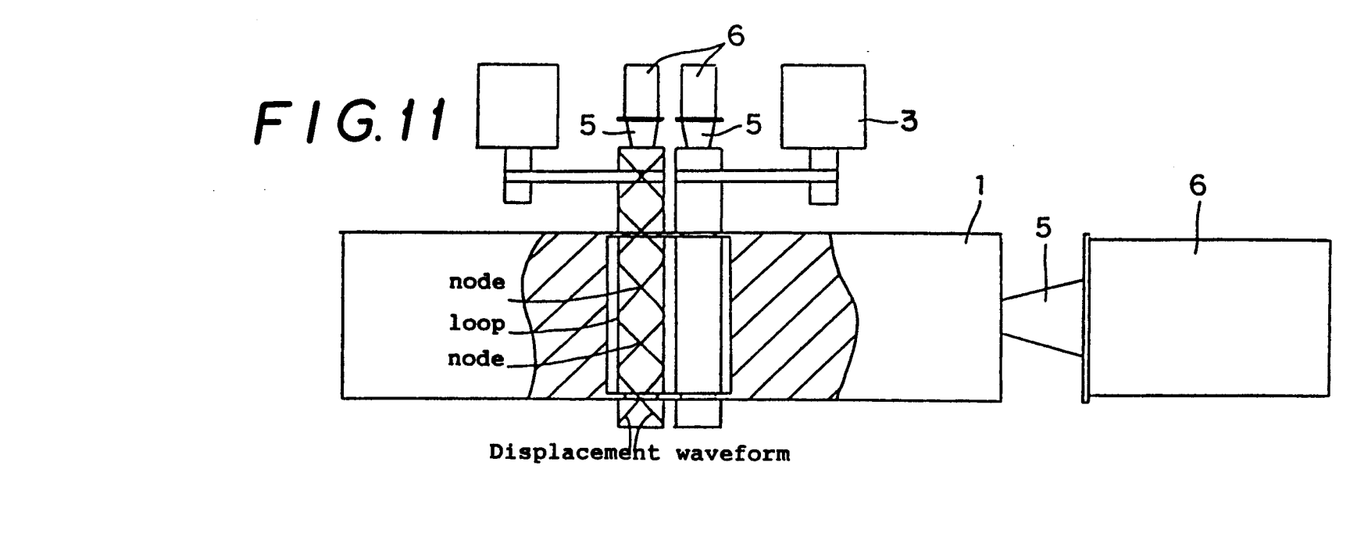
FIG. 11 is a partially cutaway conceptual plane view of the intensive mixer shown in FIG. 10.

If the ultrasonic-wave vibrations are applied to an intensive mixer as shown in FIGS. 10 and 11, which is usually, combined with a single screw extruder and calender rolls, effective heating and mixing can be obtained. The intensive mixer comprises a barrel 21 in which a chamber 21a is defined, and rotors 20 are located in the chamber 21a. In this case, the rotors 20 having blades, instead of the screw mentioned above are, used to mix the material in a mixing chamber 219, resonating the rotors 20 and/or the barrel 21 by the ultrasonic-wave vibrations.

In the embodiment of the present invention, the resonance frequency for resonating the cylinder 1 and the screw 2 lies between 10 Hz and 10 MHz, preferably, between 10 KHz and 100 KHz. To increase the speed of the plasticization of the molding material, the magnitude of the amplitude of the resonance may be made as large as possible, but the material, the shape, and the operating temperature of the cylinder 1 and the screw 2 must be taken into the consideration when determining the amplitude, and preferably, the amplitude is between 0.1 μm and 100 μm.

Vibration modes such as a longitudinal vibration mode, a transverse vibration mode, a twisted vibration mode, a radial vibration mode, a bend vibration mode, or other known vibration modes can be used.

A load applied to the ultrasonic-wave oscillator 7, and the temperature at that time, varies over the lapse of time in which the cylinder 1 and/or the screw 2 are resonated and the plasticization is carried out. To ensure the required resonance of the cylinder 1 and the screw 2, the resonance frequencies of the cylinder 1 and the screw 2 are determined to be values which are followed by the ultrasonic-wave oscillator 7. As a result, the ultrasonic-wave oscillator 7 can always follow any variation of the resonance frequencies due to variations of the load and the temperature. Also, since a required power to be supplied to the ultrasonic-wave oscillator 7 is varied with a lapse of time, a power source for the ultrasonic-wave oscillator 7 is provided with an automatic control power supply apparatus for supplying the required power (lower than a maximum power) in response to variations of the power.

The vibration generating apparatus can be a mechanical vibrator, an electrical vibrator or an electrical and hydraulic vibrator, in addition to the ultrasonic-wave transduser. But, in particular, if a ultrasonic transducer generating a ultrasonic-wave having a frequency of 10 KHz to 100 KHz is used, the intended effect of the present invention can be easily obtained.

According to the embodiment of the present invention, the molding material can be any material having at least some fluidity within the temperature range at which the cylinder 1 or the screw 2 can be properly resonated, for example, inorganic materials such as an inorganic high molecular glass, metal or ceramics, organic materials such as plastics, an elastomer or rubber, pitch, foodstuffs, or a mixture thereof. Also, a variety of reactive materials can be used as the molding material in the present invention.

More specifically, the molding plastic materials are as follows:

thermoplastic resins, for example,
α-olefin resins such as polyethylene, polypropylene, polystyrene, syndiotactic polystyrene, polyvinyl chloride, polybutene, ultra high-molecular weight polyethylene, polymethyle pentene, ionomer, or polybutylene;
polyester resins, such as polyethylene terephthalate, polybutylene terephthalate, polyarylate;
polyether resins, such as polysulfone, polyether sulfone, polyether ketone, polyetherether ketone, polyaryl sulfone, polyoxybenzylene, polyphenylene oxide, or polycyanoarylether (disclosed in Japanese Unexamined Patent Application No. 62-223226);
polycarbonate resin;
polyimide resin;
polyamide resin;
polyamideimide resin;
polymethacrylate resin;
fluorine resin;
MBS (methacrylate butadiene styrene) resin;
AAS (acrylate acrylonitrile styrene) resin;
AS (acrylonitrile styrene) resin;
ACS (acrylonitrile-chlorinate polyethylene styrene) resin;
ABS (acrylonitrile butadiene styrene) resin;
polyacethale resin;
cellulose resin;
polyvinylidene chroride;
polyethylene chloride;
EVA (ethylene vinyl acetate) resin;
polyurethane resin;
silicone resin;
allyl resin;
furan resin; or
liquid crystalline polymers;
thermosetting resins, for examples,
epoxy resin;
phenol resin;
polybutadien resin;
silicone resin;
unsaturated polyester resin; or
amino resin,
thermoplstic elastomers, for example,
styrene-butadiene elastomer;
polyester elastomer;
polyethylene elastomer; or
urethane elastomer.

Another embodiment of the present invention will be now described.

Figure 12:
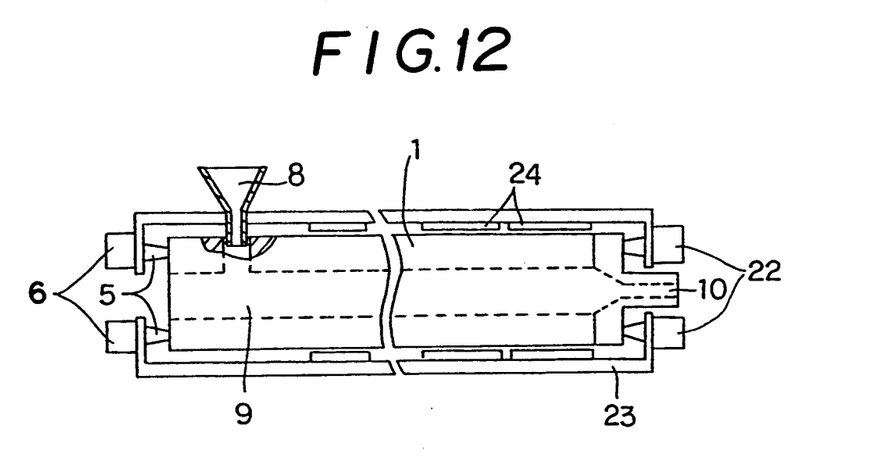
FIG. 12 is a conceptual side view of a cylinder as another embodiment of the present invention.

FIG. 12 is a conceptual side view of another embodiment of a plasticization apparatus of the molding material, according to the present invention. The plasticization apparatust is provided with the cylinder 1 having the bult-in screw 2. The cylinder 1 has a screw insertion hole 9 (not shown), and the screw 2 is inserted into the screw insertion hole 9.

In the drawing, although only two are shown, four ultrasonic transducers 6 are actually equidistantly arranged at the left side of the cylinder 1. Also, at the right side of the cylinder 1, four transducers having same characterstics as those of the ultrasonic transducer 6 are arranged as vibration absorption apparatuses 22. Note, only two transducers are shown in the drawing. The vibration absorption apparatuses 22 are provided with resistors for consuming vibration energy to thereby absorb the vibration transmitted from the ultrasonic transducer 6 to the cylinder 1. As a result, the vibration transmitted to portions where the vibration absorption apparatuses 22 are arranged is absorbed, and thus a generation of reflection waves is prevented.

Accordingly, the vibration generated by the ultrasonic transducers 6 are only progressive waves, and the molding material which comes into contact with the cylinder 1 vibrated by the progressive waves is moved forward by a strong propelling force, to greatly increase the extrusion speed.

The ultrasonic transducers 6 are arranged at a side of the molding material and the progressive waves are generated during the molding, whereby the extrusion propelling force for discharging the molding material from the release hole 10 is generated. A member having an impedance different to the impedance of the cylinder 1 can be employed as the vibration absorption means, in addition to the above means.

To generate the strong propelling force, first the reflection waves must be absorbed by the vibration absorption apparatuses 22, and to achieve this absorption, preferably the cylinder 1 has a symmetrical structure with respect to an axis directed in the same direction as that of the vibration transmission, to prevent a phase change of the progressive waves propagated in the cylinder 1 during the transmission.

A supporting member 23 attached to non-vibration portions of the ultrasonic transducers 6 and the vibration absorption apparatuses 22, is arranged at the outer circumference of the cylinder 1. Far infrared ray heaters 24 for heating the hopper 8 and the cylinder 1 are attached to the supporting member 23. If the hopper 8 is directly attached to the cylinder 1, which is vibrated with a large amplitude, the phase of the progressive waves from the ultrasonic transducers 6 to the cylinder 1 may be shifted thereat, and accordingly, the hopper 8 is arranged so that it is not in contact with the cylinder 1 and a packing such as thermal proof rubber is inserted into the gaps therebetween.

In the case of the amplitudes of the vibrations are small, the hopper 8 can be directly attached to the cylinder 1 without trouble.

Figure 13:
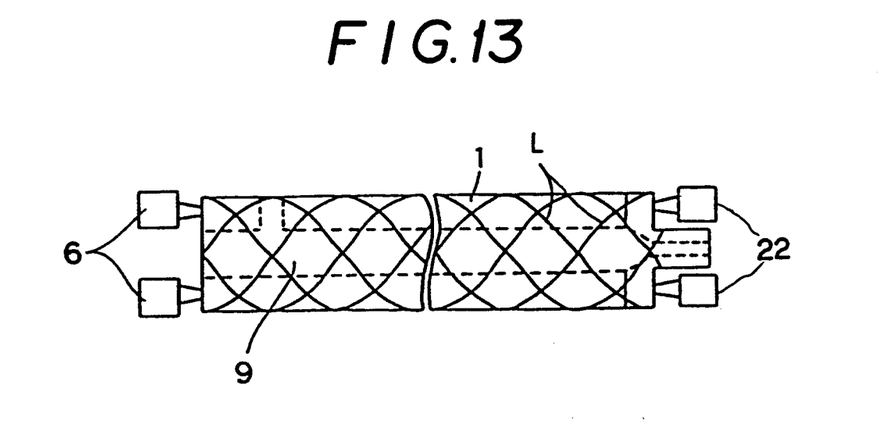
FIG. 13 is a view illustrating displacement waveforms of a cylinder as another embodiment of the present invention, when the cylinder is vibrated by progressive waves.

FIG. 13 is a view illustrating the displacement waveforms L when the vibration is generated by the ultrasonic transducers 6 of the apparatus shown in FIG. 12. The vibrations are generated by the four ultrasonic transducers 6 at the same time or at a slightly different timing, and the different timing vibrations are sequentially absorbed by the four vibration absorption apparatuses 22. A plurality of loops and nodes of the displacement waveforms L are immediately propagated, and positions thereof are moved in the direction of the vibration propagation. The vibrations from the left end of the cylinder 1 are transmitted to the right side of the cylinder 1 and eliminated thereat. As described above, when the vibrations are generated by the four ultrasonic transducers 6, the molding material in the cylinder 1 receives a propelling force based upon the progressive waves and is delivered to the release hole 10.

If the cylinder 1 is vibrated by the progressive waves, the cylinder 1 can be further resonated. One or a plurality of ultrasonic transducers (not shown), which generate vibration having a frequency different to that of the ultrasonic transducers 6, which generate the vibrations having the progressive waves shown in FIG. 12, but having a frequency at which the cylinder 1 is resonated, can be arranged at a surface on the same side as the ultrasonic transducers 6. According to this construction, a higher speed plasticization of the molding material can be achieved, and the molding material can be rapidly delivered to the release hole. Although the provision of the plurality of the vibration generation apparatuses and vibration absorption apparatuses is described above, a single vibration generation apparatus and a single vibration absorption apparatus can provide effects similar to those described above.

In this embodiment of the present invention, materials of the cylinder 1 and the screw 2, the characteristics of the vibration generation apparatuses, the vibration modes, the vibration frequencies, the applicable molding machines, and the material applicable as the molding material are similar to those of the first embodiment of the present invention, as described above.

The above mentioned methods and apparatuses for plasticizing the molding materials are applicable to injection molding processes such as an injection compression molding, a multicolor injection molding, an injection foaming molding, a reactive injection molding, a mixed-color injection molding, or a magnetic field injection molding, to extrusion molding processes such as a sheet molding, an inflation molding, a tube-pipe molding, a different-profile molding, an electric-wire coating, a filament molding, or a foaming molding; to blow molding processes such as injection blow, extrusion blow, or stretch blow; and to a transfer molding processes.

EXAMPLES

The present invention will be more specifically described with reference to examples and comparative examples. Note, these examples and comparative examples in no way limit the scope of the present invention.

EXAMPLE 1

1. Specifications of the apparatus
(1) Cylinder
   Structure: shown in FIG. 2
   Amplitude-amplification ratio of the L-L transfomer: 1.0
   Material: titanium alloy (6 Al-4 V)
   Resonance wavelength in a screw insertion direction: 1.5 wavelengths
   Resonance frequency: 19.03 KHz at 220° C.
(2) Screw
   Structure: shown in FIG. 7
   Material: SUS440C
   Diameter: 15 mm, length/diameter: 18
   Resonance wavelength: 1 wavelength
   Resonance frequency: 19.17 KHz at 220° C.
(3) Ultrasonic-wave oscillators
   The same ultrasonic-wave oscillators are employed for the cylinder and for the screw
   Basic frequency: 19.15 KHz (SEIDENSHA ELECRONICS COMPANY, LTD.: SONOPET 1200-B)
(4) Ultrasonic transducers
   PZT type (connected by respective ultrasonic-wave oscillators and horns)
2. Molding materials
Ultra high-molecular weight polyethylene (average molecular weight $M_w$: approximately one million)

Plastic magnetic material (Nylon 6/Ferrite=85 wt %/15 wt %)

3. Ultrasonic-wave application conditions
Using horns made of titanium alloy, the amplitudes are amplified as follows:
   Cylinder amplitude: 42 μm (measured at the screw insertion portion)
   Screw amplitude: 11 μm (measured at the end of the metering zone)
   Cooling of the horns: a water cooled booster made of a phosphor bronze employed only when a plastic magnet material is plasticized.
   Vibration mode: longitudinal vibration mode Under the above conditions, the ultrasonic-waves were applied to the cylinder and the screw, and the ultra high-molecular weight polyethylene molded at 190° C. The rotational speed of the screw was 200 rpm, and a stabilized plasticization was carried out at approximately 0.4 kg/hr of the flow speed. The material temperature immediately after flowing, was 202° C. to 204° C.

COMPARATIVE EXAMPLE 1

The plasticization of the ultra high-molecular weight polyethylene was attempted at 190° C. under the same conditions 1, 2 and 3 of Example 1, but the ultrasonic-wave oscillation was not used. The load of the motor was high, and accordingly, the screw could not be rotated, and consequently, the plasticization could not be caried out.

EXAMPLE 2

The plasticization of the plastic magnetic material was continuously carried out at 280° C. for 100 hours under the same conditions 1,2 and 3 of Example 1, while applying the ultrasonic-waves to the cylinder and the screw. The rotational speed of the screw was 30 rpm. Thereafter, the screw was extracted and the depth of the groove in the compression zone was measured. The rate of change of the depth of the groove was +0.3%, and an average speed of the plasticization was 0.63 kg/hr.

COMPARATIVE EXAMPLE 2

The plasticization was carried out in the same way as in Example 2 except that the ultrasonic-waves were not applied to the cylinder or screw. The screw was greatly worn, and the rate of change of the depth of the groove in the compression zone was +4.1%. The average speed of the plasticization was 0.37 kg/hr.

EXAMPLE 3

1. Specifications of the apparatus
(1) Cylinder
   Structure: shown in FIG. 12
   Material: titanium alloy (6 Al-4 V)
   Length: 300 mm
   Resonance frequency: 25.13 KHz at 180° C.
(2) Screw
   Same as for Example 1
(3) Ultrasonic-wave oscillators and ultrasonic-wave vibrators

| Parts and Functions | Fundamental frequency of ultrasonic-wave oscillators | No. |
| --- | --- | --- |
| cylinder | 19.15 KHz | 2 sets |

| Parts and Functions | Fundamental frequency of ultrasonic-wave oscillators | No. |
|---|---|---|
| progressive wave oscillating side screw resonance | 19.15 KHz | 1 set |

Two sets of ultrasonic transducers having an oscillation frequency of 19.15 KHz, but without oscillators, were employed as the vibration absorption apparatuses of the cylinder.

2. Molding materials

Straight chain ethyrene-ethyleacrelate random copolymerization
($M_w$=78000, the contents of ethylacrylate=9%)

3. Ultrasonic-wave application conditions

The amplitudes are amplified by the horns made of titanium alloy, as follows:
Cylinder amplitude: 33 μm
Screw amplitude: 11 μm
Vibration mode: longitudinal vibration mode Under the above conditions, the vibrations of the progressive waves were applied to the cylinder, the screw was resonated, and the plasticization was carried out at 160° C. The rotational speed of the screw was 20 rpm. The load current of the motor for rotating the screw was 6 A, and the extrusion speed was 0.5 kg/hr.

EXAMPLE 4

The plasticization was carried out under the same conditions of Example 3 except that further the cylinder was resonated at approxmately 25 KHz, and the following results were obtained: the load current of the motor was 3.5 A and the extrusion speed was 0.55 kg/hr.

COMPARATIVE EXAMPLE 3

The test was carried out under the same conditions as of Example 3, but the vibrations for resonating the cylinder and the screw were stopped, and the following results were obtained: the load current of the motor was 6.5 A and the extrusion speed was 0.39 kg/hr.

As a result, it can be clearly understood that the flow-resistance of the molding material is lowered, the time for carrying out the plasticization is shortened, and the abrasion of the screw is reduced.

The present invention has been described with reference to specific embodiments, but a variety of modifications of the embodiments, which are clear to persons with ordinary skill in the art to which the invention pertains, can be included in the scope of the present invention.

We claim:

1. A method of plasticizing a molding material by supplying the molding material to a cylinder having a rotatable built-in screw therein for moving the molding material in said cylinder, said cylinder having zones consisting of a supply zone and a compression zone for the molding material, the method comprising the steps of:
    (a) generating a first ultrasonic-wave vibration having a frequency in the range of 10 Hz to 10 MHz with a first ultrasonic transducer which is energized by a first ultrasonic-wave oscillator;
    (b) transmitting said first ultrasonic-wave vibration to an ultrasonic-vibration direction changing means mounted on said cylinder in the manner that a part of said ultrasonic-vibration direction changing means constitutes a part of said cylinder and is disposed in one of said zones of said cylinder, said ultrasonic-vibration direction changing means having at least one section outwardly projecting from said cylinder, said projecting section having an end, wherein said first ultrasonic-wave vibration is transmitted through said end of said projecting section;
    (c) changing the direction of said first ultrasonic-wave vibration transmitted to said ultrasonic-wave vibration direction changing means with said ultrasonic-wave vibration direction changing means by approximately 90 degrees;
    (d) applying said first ultrasonic-wave vibration to said cylinder in the direction parallel to the moving direction of said molding material; and
    (e) resonating at least one of said zones of said cylinder by said first ultrasonic-wave vibration at a frequency in the range of 10 Hz to 10 MHz, wherein the resonance is an n wavelength resonance, where n is m/2 and m is one of the integers of 1 to 20.

2. A method of plasticizing a molding material according to claim 1, wherein said method further includes the steps of:
    (f) generating a second ultrasonic-wave vibration having a frequency in the range of 10 Hz to 10 MHz with a second ultrasonic transducer which is energized by a second ultrasonic-wave oscillator, said second ultrasonic transducer being connected to said screw in said cylinder; and
    (g) applying said second ultrasonic-wave vibration to said screw in the direction parallel to the moving direction of said molding material so as to resonate said screw at a frequency in the range of 10 Hz to 10 MHz, wherein the resonance of said screw is an n wavelength resonance, where n is m/2 and m is one of the integers 1 to 20.

3. A method of plasticizing a molding material according to claim 2, wherein
    said resonance of said cylinder is in first displacement waveforms having first loops and first nodes and
    said resonance of said screw is in second displacement waveforms having second loops and second nodes,
    each of said first loops is close to one of said second loops, and
    one of said first nodes is within said ultrasonic-wave vibration direction changing means and is close to one of said second nodes.

4. A method of plasticizing a molding material according to claim 1, wherein said ultrasonic-wave vibration direction changing means is a longitudinal-longitudinal (L-L) transformer.

5. A method of plasticizing a molding material according to claim 1, wherein said ultrasonic-wave vibration direction changing means is a radial-longitudinal (R-L) transformer.

6. A method of plasticizing a molding material according to claim 1, wherein said ultrasonic-wave vibration direction changing means is a longitudinal-longitudinal-longitudinal (L-L-L) transformer.

7. An apparatus for plasticizing a molding material including a cylinder having a screw insertion hole therein and a rotatable built-in screw inserted into said screw insertion hole for moving said molding material in said cylinder, said cylinder having zones consisting of a supply zone and a compression zone for the molding material, said apparatus comprising:
(a) an ultrasonic-vibration direction changing means mounted on said cylinder in the manner that a part of said ultrasonic-vibration direction changing means constitutes a part of said cylinder and is disposed in one of said zones of said cylinder, said ultrasonic-vibration direction changing means having at least one section outwardly projecting from said cylinder, said projecting section having an end, said ultrasonic-vibration direction changing means being capable of changing the direction of vibration applied thereto through said end of said projecting section by approximately 90 degrees;
(b) a first ultrasonic transducer for generating a first ultrasonic-wave vibration having a frequency in the range of 10 Hz to 10 MHz;
(c) a first ultrasonic-wave oscillator for energizing said first ultrasonic transducer; and
(d) means for transmitting said first ultrasonic-wave vibration to said ultrasonic-vibration direction changing means through said end of said projecting section of said ultrasonic-vibration direction changing means so that said ultrasonic-vibration direction changing means changes the direction of said first ultrasonic-wave vibration by approximately 90 degrees and said first ultrasonic-wave vibration is applied to said cylinder in the direction parallel to the moving direction of said molding material, wherein at least one of said zones of said cylinder is resonated by said first ultrasonic-wave vibration at a frequency in the range of 10 Hz to 10 MHz, wherein the resonance is an n wavelength resonance, where n is m/2 and m is one of the integers 1 to 20.

8. A plasticizing apparatus for plasticizing a molding material according to claim 7, wherein said apparatus further comprises:
(e) a second ultrasonic transducer for generating a second ultrasonic-wave vibration having a frequency in the range of 10 Hz to 10 MHz;
(f) a second ultrasonic-wave oscillator for energizing said second ultrasonic transducer; and
(g) means for transmitting said second ultrasonic-wave vibration to said screw inserted in said cylinder, thereby causing said screw to be resonated by said second ultrasonic-wave vibration at a frequency in the range of 10 Hz to 10 MHz, wherein the resonance is an n wavelength resonance, where n is m/2 and m is one of the integers of 1 to 20.

9. An apparatus for plasticizing a molding material according to claim 7, wherein said ultrasonic-wave vibration direction changing means is a longitudinal-longitudinal (L-L) transformer.

10. A method of plasticizing a molding material according to claim 7, wherein said ultrasonic-wave vibration direction changing means is a radial-longitudinal (R-L) transformer.

11. A method of plasticizing a molding material according to claim 7, wherein said ultrasonic-wave vibration direction changing means is a longitudinal-longitudinal-longitudinal (L-L-L) transformer.

* * * * *